United States Patent
Tanaka et al.

(10) Patent No.: US 10,284,781 B2
(45) Date of Patent: May 7, 2019

(54) IMAGING APPARATUS AND IMAGE BLUR CORRECTION METHOD THEREFOR

(71) Applicant: OLYMPUS CORPORATION, Hachioji-shi, Tokyo (JP)

(72) Inventors: Kiyoshi Tanaka, Tokyo (JP); Hitoshi Tsuchiya, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/419,463

(22) Filed: Jan. 30, 2017

(65) Prior Publication Data

US 2017/0142338 A1 May 18, 2017

Related U.S. Application Data

(63) Continuation of application No. PCT/JP2015/071471, filed on Jul. 29, 2015.

(30) Foreign Application Priority Data

Aug. 4, 2014 (JP) ................................. 2014-159069

(51) Int. Cl.
  *H04N 5/228* (2006.01)
  *H04N 5/232* (2006.01)
  (Continued)

(52) U.S. Cl.
  CPC ........... *H04N 5/23287* (2013.01); *G03B 5/00* (2013.01); *G06T 5/003* (2013.01); *H04N 5/2253* (2013.01);
  (Continued)

(58) Field of Classification Search
  CPC ...... G03B 5/00–5/02; G03B 5/06–5/08; G03B 2217/005; G03B 2205/00;
  (Continued)

(56) References Cited

U.S. PATENT DOCUMENTS

| | | | |
|---|---|---|---|
| 5,155,520 A | 10/1992 | Nagasaki et al. | |
| 8,509,609 B2 * | 8/2013 | Wakamatsu | G02B 27/646 348/208.99 |

(Continued)

FOREIGN PATENT DOCUMENTS

| | | |
|---|---|---|
| JP | 03-210884 A | 9/1991 |
| JP | 09-261524 A | 10/1997 |

(Continued)

OTHER PUBLICATIONS

English translation of International Search Report dated Oct. 6, 2015 in PCT/JP2015/071471 (2 pgs).

(Continued)

*Primary Examiner* — Ngoc Yen T Vu
(74) *Attorney, Agent, or Firm* — Volpe and Koenig, P.C.

(57) ABSTRACT

An imaging apparatus includes an image sensor configured to perform photoelectric conversion on a subject image formed by an optical system, a first driving actuator configured to cause translation and a rotational movement of the image sensor, a first angular velocity detector configured to detect a first rotation angular velocity, a second angular velocity detector configured to detect a second rotation angular velocity, a third angular velocity detector configured to detect a third rotation angular velocity, and an image blur correction control unit configured to control the first driving actuator so that the first driving actuator causes both the translation and the rotational movement, on the basis of a first rotation angular velocity, a second rotation angular velocity, a third rotation angular velocity, an optical center position of the optical system and a rotation center position of the image sensor.

5 Claims, 13 Drawing Sheets

(51) Int. Cl.
  *G03B 5/00*      (2006.01)
  *G06T 5/00*      (2006.01)
  *H04N 5/225*     (2006.01)
  *G03B 17/00*     (2006.01)

(52) U.S. Cl.
  CPC ........... *H04N 5/2254* (2013.01); *H04N 5/232* (2013.01); *H04N 5/23209* (2013.01); *H04N 5/23258* (2013.01); *H04N 5/23296* (2013.01); *G03B 2205/0015* (2013.01); *G03B 2217/005* (2013.01)

(58) Field of Classification Search
  CPC .... G03B 2205/0007–2205/0038; G06T 5/003; H04N 5/23258; H04N 5/23287; H04N 5/2253
  See application file for complete search history.

(56) References Cited

U.S. PATENT DOCUMENTS

| | | | | |
|---|---|---|---|---|
| 8,643,732 B2* | 2/2014 | Miyoshi | .............. | H04N 5/2328 348/208.7 |
| 8,958,010 B2* | 2/2015 | Kawai | ................ | H04N 5/23287 348/208.11 |
| 8,971,696 B2* | 3/2015 | Wakamatsu | ......... | G02B 27/646 348/208.7 |
| 9,557,575 B2* | 1/2017 | Miyoshi | ............... | G02B 27/646 |
| 9,568,742 B2* | 2/2017 | Miyazawa | ............. | G02B 27/64 |
| 9,800,789 B2* | 10/2017 | Tsuchiya | ............ | H04N 5/23287 |
| 2008/0298790 A1 | 12/2008 | Uenaka et al. | | |
| 2012/0321132 A1 | 12/2012 | Ohta | | |

FOREIGN PATENT DOCUMENTS

| | | | | |
|---|---|---|---|---|
| JP | 2006-115346 | A | 4/2006 | |
| JP | 2006115346 | * | 4/2006 | ............ H04N 5/232 |
| JP | 2008-257209 | A | 10/2008 | |
| JP | 2013-005244 | A | 1/2013 | |
| JP | 2013-257519 | A | 12/2013 | |

OTHER PUBLICATIONS

Written Opinion dated Oct. 6, 2015 in PCT/JP2015/071471 (4 pgs).
English Translation of Written Opinion dated Oct. 6, 2015 in PCT/JP2015/071471, consisting of 3 pp.
Office Action issued in corresponding Japanese Patent Appln. No. 2014-159069 dated Jul. 31, 2018, consisting of 9 pp.

* cited by examiner

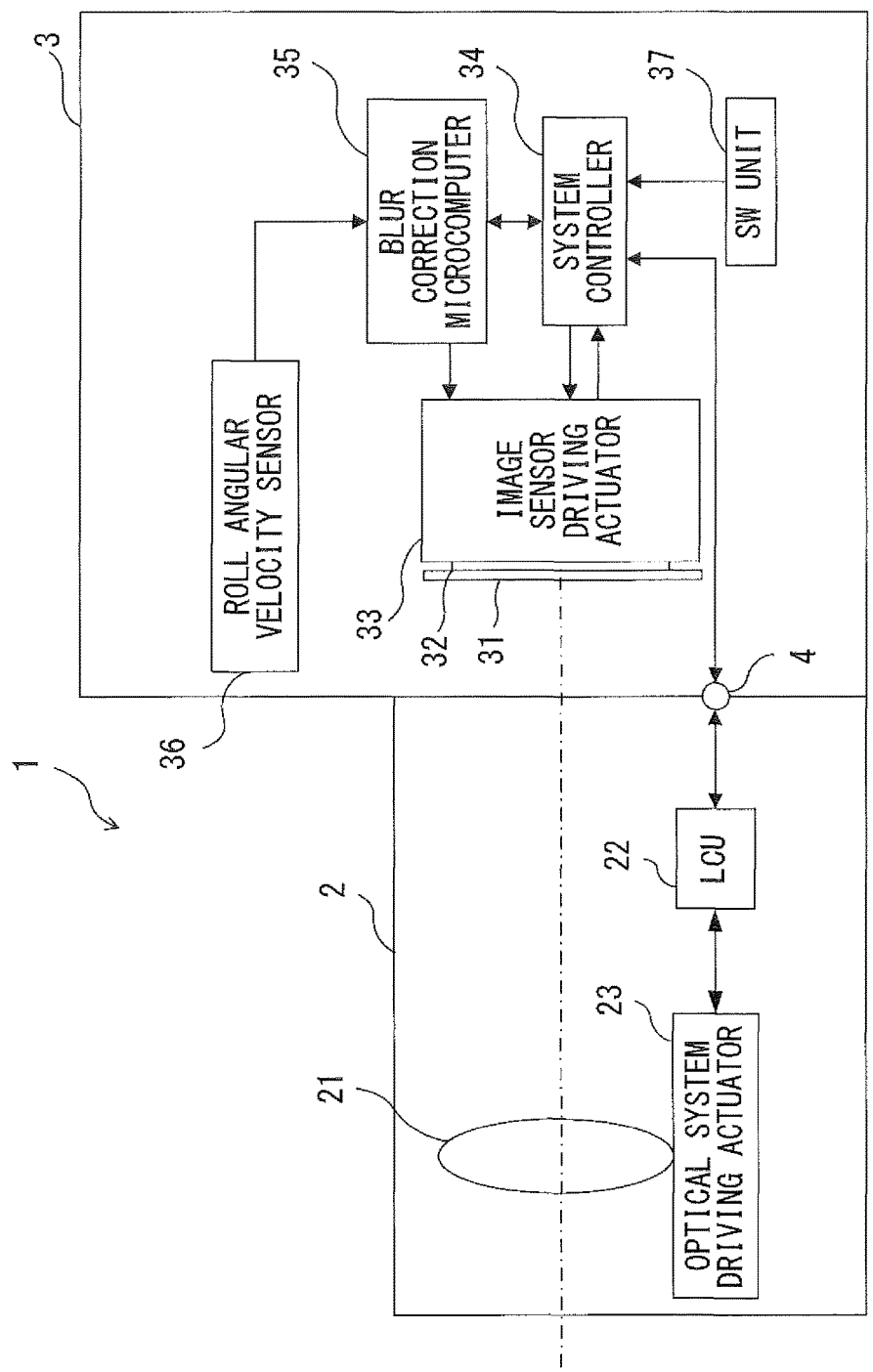
F I G. 4

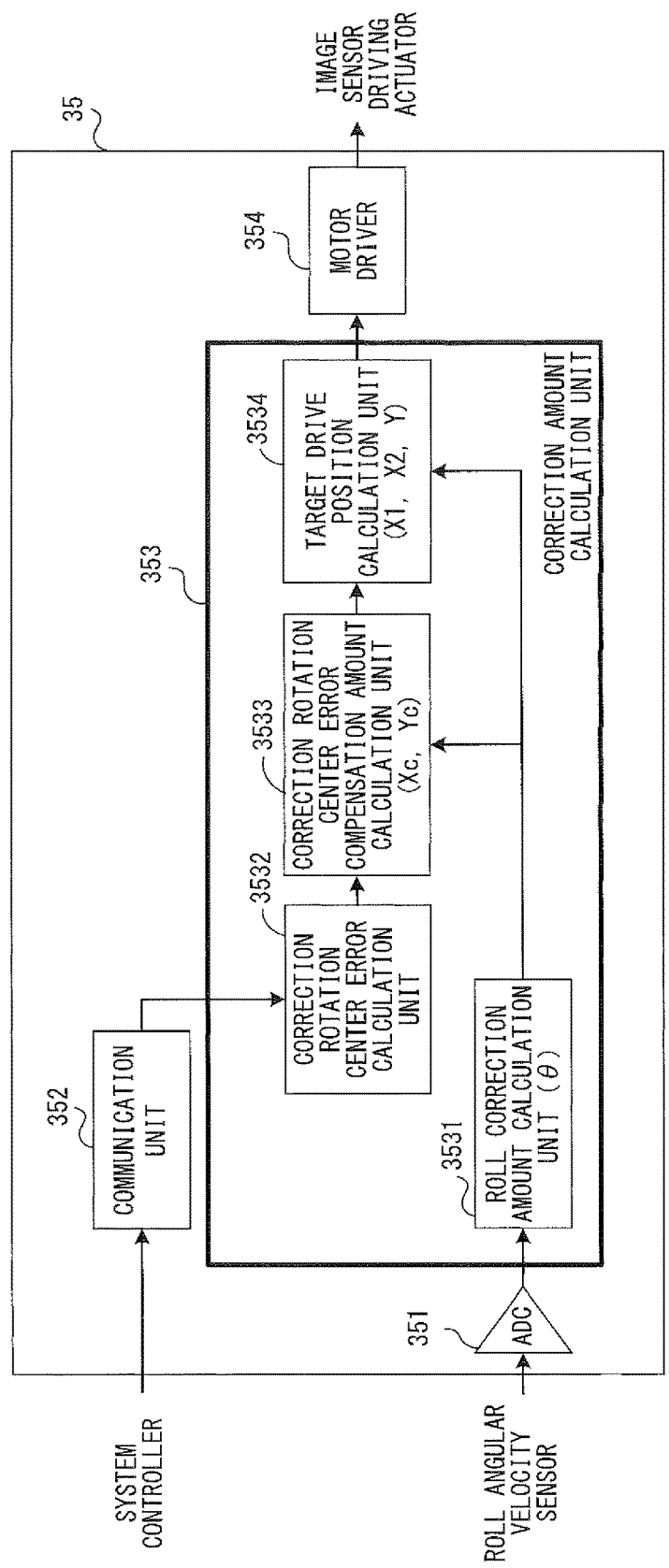
F I G. 6

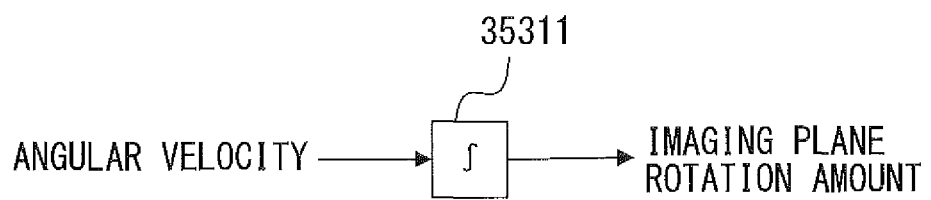
F I G. 7

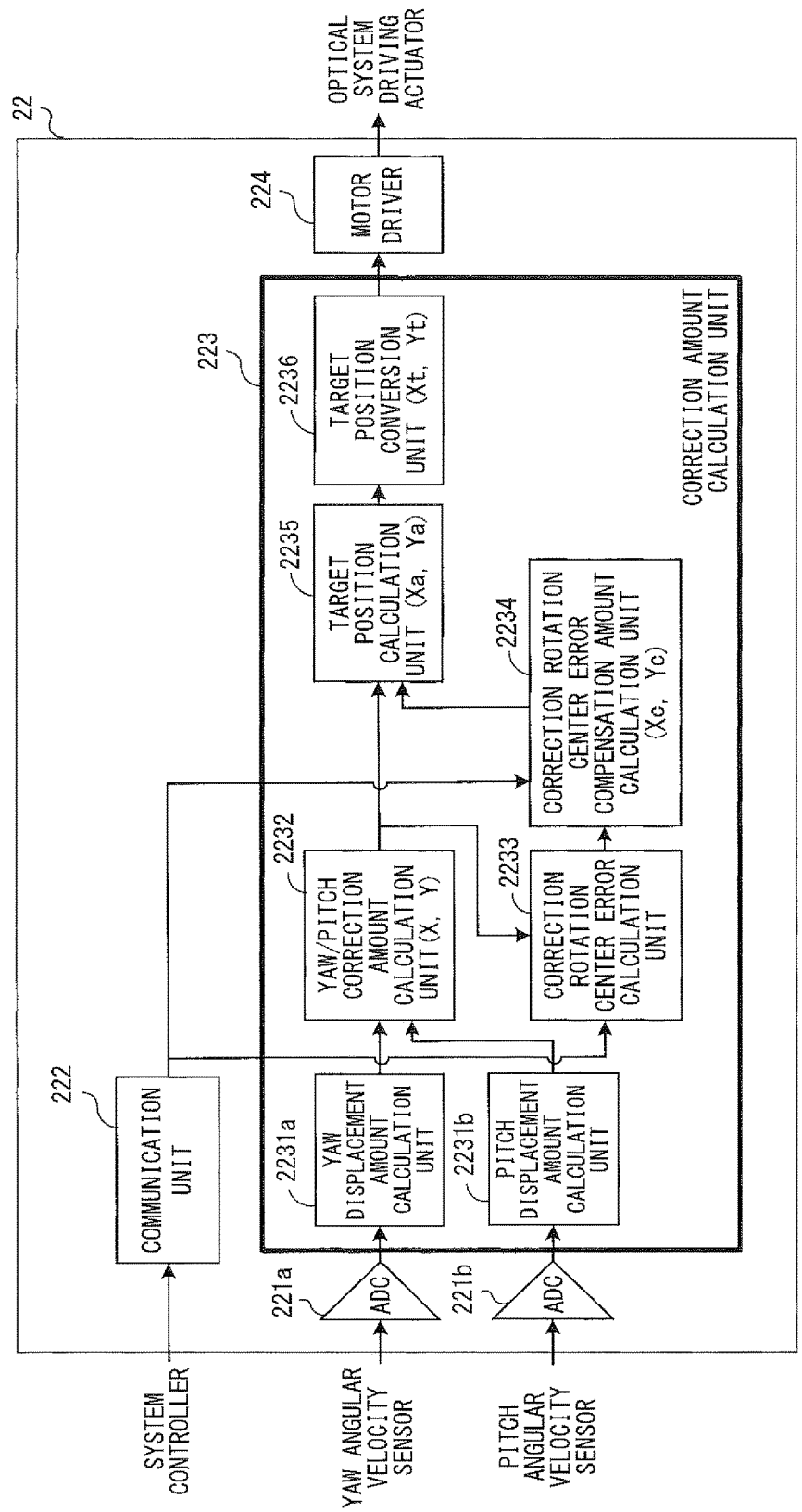
F I G. 11

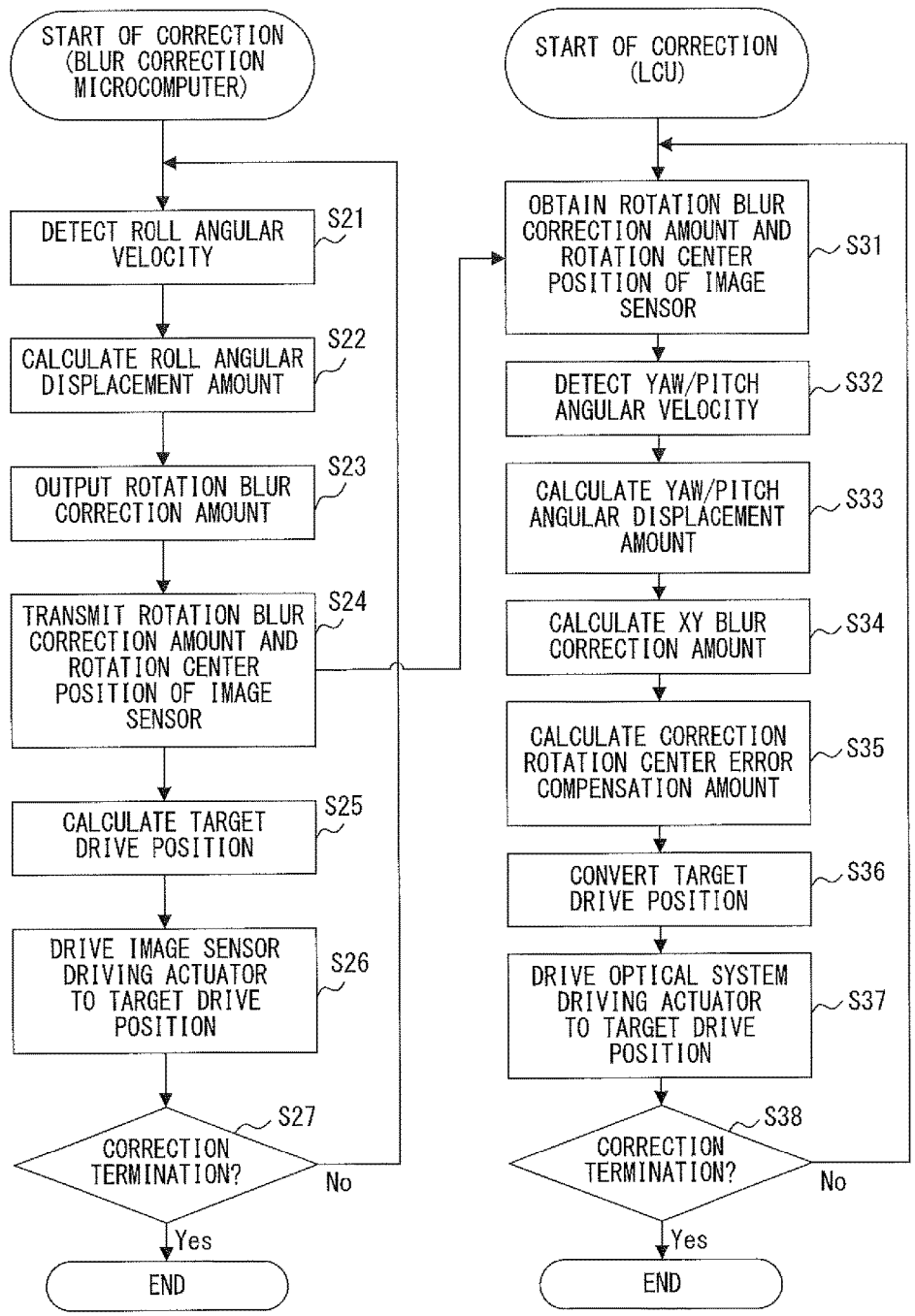
F I G. 1 3

IMAGING APPARATUS AND IMAGE BLUR CORRECTION METHOD THEREFOR

CROSS-REFERENCE TO RELATED APPLICATIONS

This application is based upon and claims the benefit of priority of the prior Japanese Patent Application No. 2014-159069, filed on Aug. 4, 2014, the entire contents of which are incorporated herein by reference.

This is a Continuation Application of PCT Application No. PCT/JP2015/071471, filed on Jul. 29, 2015, which was not published under PCT Article 21(2) in English.

FIELD

The present invention is related to an imaging apparatus having a function of correcting an image blur caused by camera shaking etc. and to an image blur correction method thereof.

BACKGROUND

As a camera shaking correction function for cameras, a camera shaking correction function has conventionally been known that corrects an image blur (angular blur) caused by a change in the orientation in the Yaw directions and the Pitch directions of the camera due to camera shaking. In recent years, in response to higher performance of the camera shaking correction function, there is also a camera shaking correction function that corrects an image blur (translation blur) accompanying the translation in the longitudinal (vertical) and lateral (horizontal) directions of the camera caused by camera shaking, in addition to the above camera shaking correction function. There is also a camera shaking correction function that corrects an image blur (rotation blur) caused by a change in the orientation in the Roll directions of the camera 1 due to camera shaking. A camera that has realized a correction of any types of image blurs by being provided with a combination of these camera shaking correction functions has also emerged.

Regarding a camera shaking correction function for correcting the above rotation blurs, it is known that such a function achieves an effect of image blur correction when the photographer holds the camera with his or her hands so as to perform long time-lapse exposure photography (photography with a long period of time of exposure).

Note that the camera described in Patent Document 1 (Japanese Laid-open Patent Publication No. 9-261524) for example is known as a camera provided with a camera shaking correction function. This camera has an X-Y actuator for moving a CCD image sensor in the horizontal and vertical directions and a rotation actuator for causing it to move rotationally. Then, by driving the X-Y actuator on the basis of an output from a Pitch sensor and a Yaw sensor and by driving the rotation actuator on the basis of an output from an inclination sensor, an image blur is corrected.

When a rotational movement about the optical axis directions of the optical system of a camera occurs (which is also a case where a change in the orientation in the Roll directions of the camera 1 occurs), the subject image formed on the image sensor of the camera rotates on the optical center of the optical system. Note that the optical center of the optical system is also the optical axis center of the optical system.

Meanwhile, a camera shaking correction function for correcting an image blur caused by a change in the orientation in the Roll directions of the camera 1 corrects that image blur by rotating the image sensor on the image plane center of the image sensor that captures a subject image formed by the optical system.

Generally, a camera is configured so that the optical center of the optical system and the image plane center of the image sensor coincide.

Also, there is a camera shaking correction function that corrects an image blur accompanying a change in the orientation of the camera in the Yaw and Pitch directions and an image blur accompanying translation in the longitudinal and lateral directions of the camera, by shifting the optical axis directions of the optical system by translating the correcting lens included in the optical system. In this type of a camera shaking correction function, when the optical axis directions of the optical system is shifted by the translation of the correcting lens, the optical center of the optical system and the image plane center of the image sensor do not coincide. Also in a camera shaking correction function that corrects such an image blur by the translation of the image sensor, the translation of the image sensor causes the optical center of the optical system and the image plane center of the image sensor to not coincide.

Note that because an image blur accompanying a change in the orientation of a camera in the Roll directions in a case when the optical center of the optical system and the image plane center of the image sensor coincide becomes smaller gradually toward the center from the periphery of a captured image, the image blur is not so noticeable in the entire captured image.

SUMMARY

An aspect of the present invention provides an imaging apparatus including an optical system configured to form a subject image, an image sensor configured to perform photoelectric conversion on a subject image formed by the optical system, a first driving actuator configured to cause translation and a rotational movement of the image sensor, a second driving actuator configured to cause translation of an image blur correction lens included in the optical system, a first angular velocity detector configured to detect a first rotation angular velocity with respect to optical axis directions of the optical system as a rotation axis, a second angular velocity detector configured to detect a second rotation angular velocity with respect to first directions, which are orthogonal to optical axis directions of the optical system, as a rotation axis, a third angular velocity detector configured to detect a third rotation angular velocity with respect to second directions, which are orthogonal to the first directions, as a rotation axis, and an image blur correction control unit configured to control the first driving actuator so that the first driving actuator causes both the translation and the rotational movement, on the basis of a first rotation angular velocity detected by the first angular velocity detector, a second rotation angular velocity detected by the second angular velocity detector, a third rotation angular velocity detected by the third angular velocity detector, an optical center position of the optical system and a rotation center position of the image sensor.

Another aspect of the present invention provides an image blur correction method for an imaging apparatus having an optical system configured to form a subject image, an image sensor configured to perform photoelectric conversion on a subject image formed by the optical system, a first driving actuator configured to cause translation and a rotational movement of the image sensor, a second driving actuator configured to cause translation of an image blur correction lens included in the optical system, a first angular velocity detector configured to detect a first rotation angular velocity with respect to optical axis directions of the optical system as a rotation axis, a second angular velocity detector configured to detect a second rotation angular velocity with respect to first directions, which are orthogonal to optical axis directions of the optical system, as a rotation axis, and a third angular velocity detector configured to detect a third rotation angular velocity with respect to second directions, which are orthogonal to the first directions, as a rotation axis, the method including detecting, by using the first angular velocity detector, the first rotation angular velocity, detecting, by using the second angular velocity detector, the second rotation angular velocity, detecting, by using the third angular velocity detector, the third rotation angular velocity, and controlling the first driving actuator so that an image blur is corrected, on the basis of the first rotation angular velocity, the second rotation angular velocity, the third rotation angular velocity, an optical center position of the optical system and a rotation center position of the image sensor.

BRIEF DESCRIPTION OF DRAWINGS

FIG. 4 shows a configuration example of the camera according to a first embodiment;

FIG. 6 shows an internal configuration example of a blur correction microcomputer according to the first embodiment;

FIG. 7 shows an internal configuration example of a Roll correction amount calculation unit according to the first embodiment;

FIG. 11 shows an internal configuration example of an LCU according to the second embodiment;

FIG. 13 is a flowchart showing an example of an image blur correction operation of the camera according to the second embodiment.

DESCRIPTION OF EMBODIMENTS

Figure 1:
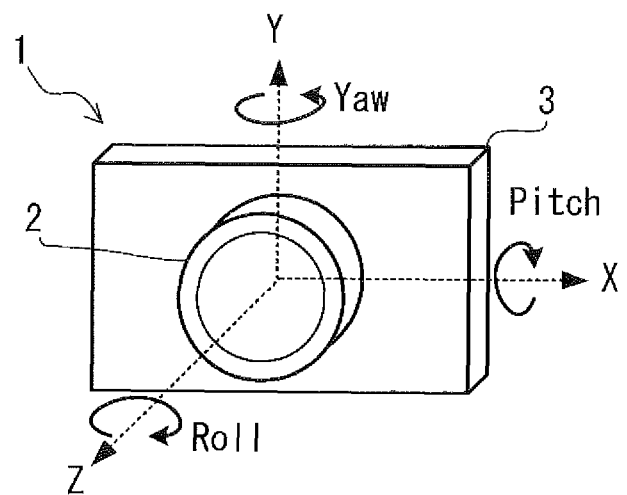
FIG. 1 explains the definitions of the directions.

Hereinafter, the embodiments of the present invention will be explained by referring to the drawings.

First, before the explanations for a camera according to each embodiment, explanations will be given for the outline of a rotation blur correction performed by the camera together with the definitions of the directions used in the explanations.

FIG. 1 explains the definitions of the directions.

As shown in FIG. 1, a camera 1 of each embodiment, which will be explained later, has a configuration in which an interchangeable lens 2 is mounted on a camera body 3. In the above camera 1, the X directions, the Y directions, the Z directions, the Pitch directions, the Yaw directions and the Roll directions will be defined as below.

The lateral directions (horizontal directions) of the camera body 3 are defined as X directions. Further, the right direction along the X directions for a position facing the front of the camera body 3 is defined as + direction, while the left direction under the same condition is defined as – direction. This definition of the X directions applies also to the right and left directions of the image plane of an image sensor, which will be described later.

The longitudinal directions (vertical directions) of the camera body 3 are defined as Y directions. Further, the upper direction along the Y directions is defined as + direction, while the lower direction along the Y directions is defined as – direction. This definition of the Y directions applies also to the upper and lower directions of the image plane of an image sensor, which will be described later.

The optical axis directions of the optical system included in the interchangeable lens 2 are defied as Z directions. Further, the direction along the Z directions toward the interchangeable lens side from the camera body side is defined as the + direction, while the direction along the Z directions toward the camera body side from the interchangeable lens side is defined as the – direction.

The directions of the rotation on the X directions are defined as the Pitch directions. Further, the left direction along the Pitch directions with respect to the +X direction is defined as the + direction, while the right direction along the Pitch directions with respect to the +X direction is defined as the – direction.

The directions of the rotation on the Y directions are defined as the Yaw directions. Further, the right direction along the Yaw directions with respect to the +Y direction is defined as the + direction, while the left direction along the Yaw directions with respect to the +Y direction is defined as the – direction.

The directions of the rotation on the Z directions are defined as the Roll directions. Further, the left direction along the Roll directions with respect to the +Z direction is defined as the + direction, while the right direction along the Roll directions with respect to the +Z direction is defined as the – direction.

As a matter of course, the positive and negative signs added to the directions defined above are used depending upon the implementation directions of an angular velocity sensor, which will be described later, and therefore are not limited to the usages in the above examples.

Figure 2:
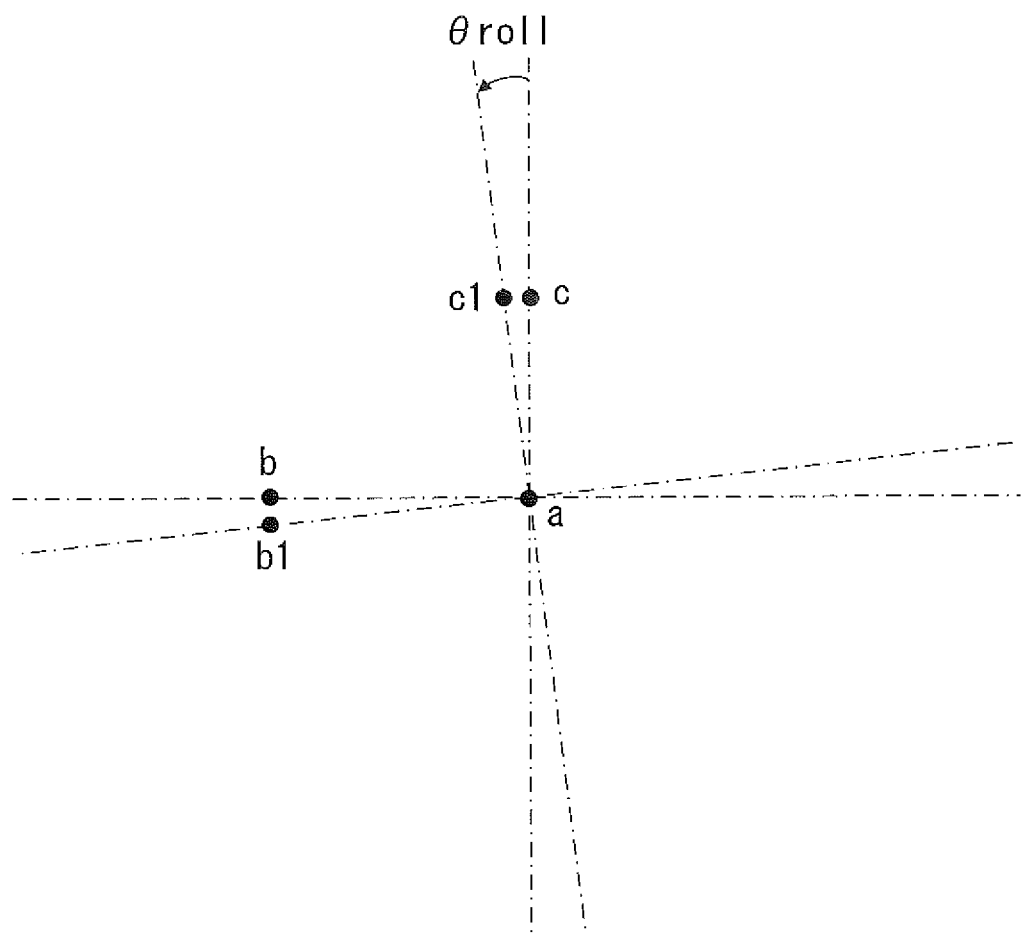
FIG. 2 is a first view explaining the outline of a rotation blur correction performed by a camera of each embodiment (correction of an image blur caused by a change in the orientation in the Roll directions of the camera)
Figure 3:
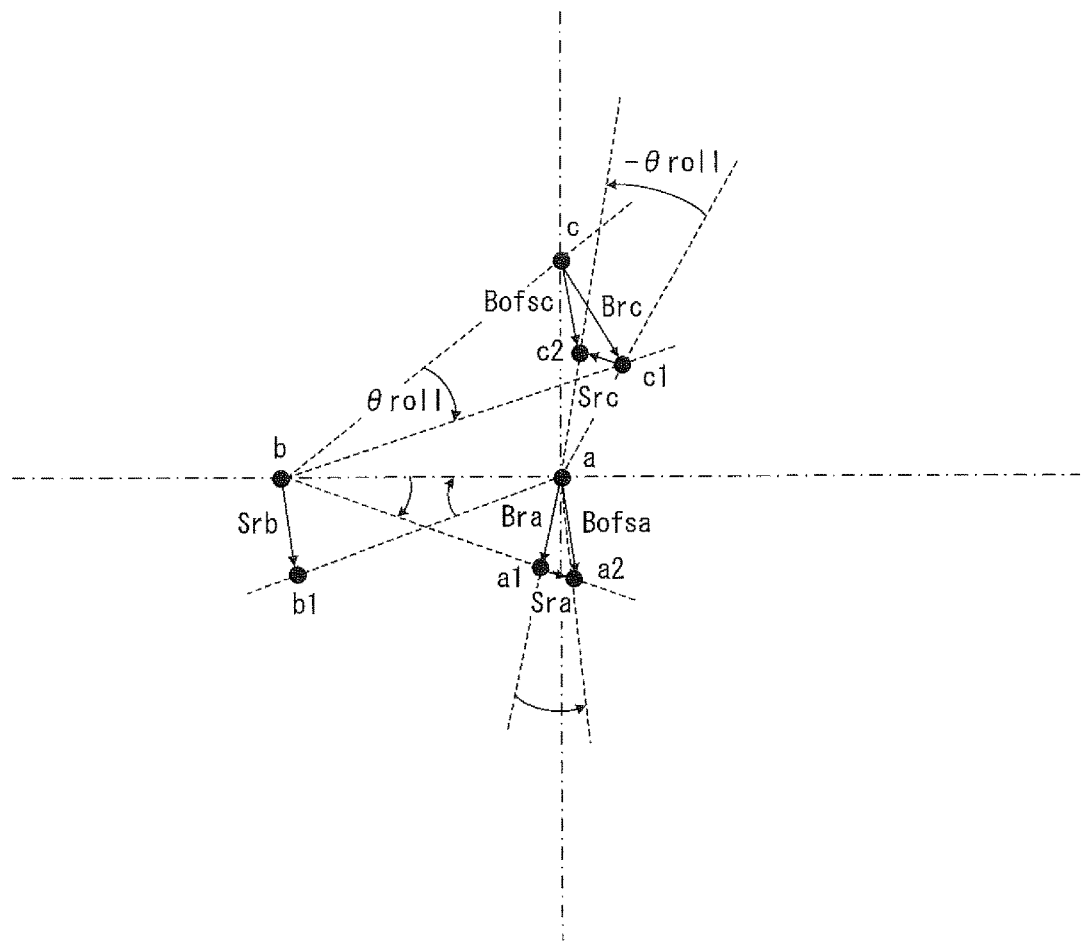
FIG. 3 is a second view explaining the outline of a rotation blur correction performed by a camera of each embodiment (correction of an image blur caused by a change in the orientation in the Roll directions of the camera)

FIG. 2 and FIG. 3 explain the outline of a rotation blur correction performed by the camera 1 of each embodiment (correction of an image blur caused by a change in the orientation in the Roll directions of the camera 1).

FIG. 2 shows a movement example of each point of a subject image formed on an image plane in a case when a change occurs in the orientation in the Roll directions of the camera 1 with the optical center of the optical system and the image plane center of the image sensor coinciding in the camera 1. It is assumed in FIG. 2 that points a, b, b1, c and c1 are points on the image plane and point a is also a point located at the optical center and the image plane center.

In such a case, the point of the subject image at point a is also a point at the optical center and thus the point does not move even when a change (θ roll) occurs in the orientation of the camera 1 in the Roll directions. Meanwhile, the points of the subject image at points b and c rotate on the optical center (point a) so as to move to points b1 and c1 when a change (θ roll) occurs in the orientation in the Roll directions of the camera 1.

Accordingly, when a change (θ roll) occurs in the orientation in the Roll directions of the camera 1 with the optical center and the image plane center coinciding, the rotation blur can be corrected by causing the image sensor to move rotationally and inversely (−θ roll) on the image plane center (point a).

FIG. 3 shows a movement example of each point of a subject image formed on an image plane in a case when a change occurs in the orientation in the Roll directions of the camera 1 with the optical center of the optical system and the image plane center of the image sensor not coinciding in the camera 1. It is assumed in FIG. 3 that points a, a1, a2, b, b1, c, c1 and c2 are points on the image plane, point a is also a point at the image plane center and point b is at the optical center.

In such a case, the point of the subject image at point b is at the optical center and thus the point does not move even when a change (θ roll) occurs in the orientation of the camera 1 in the Roll directions. Meanwhile, the points of the subject image at points a and c rotate on the optical center (point b) so as to move to points a1 and c1 when a change (θ roll) occurs in the orientation in the Roll directions of the camera 1.

In such a case, when a rotation blur correction is performed similarly to the example shown in FIG. 2, the image sensor rotates inversely (−θ roll) on the image plane center (point a) so that the points of the subject image at points a1, b and c1 move to points a2, b1 and c2.

It is assumed that the magnitude of vector aa1 having its starting point at point a and its endpoint at point a1 is Bra and the magnitude of vector cc1 having its starting point at point c and its ending point at point c1 is Brc. It is also assumed that the magnitude of vector a1a2 having its starting point at point a1 and its endpoint at point a2 is Sra, the magnitude of vector bb1 having its starting point at point b and its ending point at point b1 is Srb and the magnitude of vector c1c2 having its starting point at point c1 and its endpoint at point c2 is Src. It is also assumed that the magnitude of vector aa2 (sum of vector aa1 and vector a1a2) having its starting point at point a and its endpoint at point a2 is Bofsa and the magnitude of vector cc2 (sum of vector cc1 and vector c1c2) having its starting point at point c and its endpoint at point c2 is Bofsc. In such a case, magnitude Srb of vector bb1 is equal to each of magnitude Bofsa of vector aa2 and magnitude of Bofsc of vector cc2. Also, the direction of vector bb1 is equal to each of the directions of vector aa2 and vector cc2. In other words, vector bb1 is equal to each of vector aa2 and vector cc2.

Accordingly, when a change (θ roll) occurs in the orientation in the Roll directions of the camera 1 with the optical center and the image plane center not coinciding, the entire rotation blur correction can be conducted by conducting a rotation blur correction (tentative rotation blur correction) similarly to the case shown in FIG. 2 and also by relatively translating the subject image with respect to the image plane in a direction of cancelling a positional shift (vector bb1=vector aa2=vector cc2) caused by the noncoincidence between the optical center and the image plane center caused by the rotational movement (−θ roll) of the image sensor occurring upon the rotation blur correction.

In view of the above, detailed explanations will be given for the camera 1 of each embodiment.

First Embodiment

The camera 1 according to the first embodiment is a camera having a function of correcting an image blur caused by a change in the orientation in the Roll directions of the camera 1.

FIG. 4 shows a configuration example of the camera 1 according to the present embodiment.

As shown in FIG. 4, the camera 1 of the present embodiment has a configuration in which the interchangeable lens 2 is mounted on the camera body 3. Note that the camera body 3 is configured to allow the interchangeable lens 2 to be attached to it and detached from it. The mounting of the interchangeable lens 2 on the camera body 3 is realized by jointing together the lens mount connection unit (not shown) provided to the interchangeable lens 2 and the body mount connection unit (not shown) provided to the camera body 3. This results in a situation where the interchangeable lens 2 is fixed to the camera body 3 and electric connection between the terminals in the respective mount connection units is realized so that communications between the camera body 3 and the interchangeable lens 2 are possible via a contact point 4.

The interchangeable lens 2 includes an optical system 21, an LCU (lens control unit) 22 and an optical system driving actuator 23.

The optical system 21 forms the light flux from the subject on the image plane of an image sensor 32. Note that the optical system 21 includes a lens group (not shown) for adjusting a focal position (which will be referred to as a "focus lens") and a lens group (not shown) for adjusting a focal length (which will be referred to as a "zoom lens").

The optical system driving actuator 23 moves a focus lens and a zoom lens included in the optical system 21 in the optical axis directions under control of the LCU 22. Thereby, focal position adjustment (which will be referred to as "focusing") and focal length adjustment (which will be referred to as "zooming") are conducted.

The LCU 22 includes a processor (CPU for example) that performs a computation process for controlling the overall operations of the interchangeable lens 2 and an electronic circuit. The LCU 22 controls the overall operations of the interchangeable lens 2 in addition to conducting communications with a system controller 34 in the camera body 3 via the contact point 4. For example, the LCU 22 controls the optical system driving actuator 23 in cooperation with the system controller 34 so as to control the focusing and zooming. Also, for example, the LCU 22 monitors the position of the optical system 21 so as to obtain the optical center position of the optical system 21 from that position of the optical system 21, and transmits the optical center position to the system controller 34 via the contact point 4.

Note that the optical center of the optical system 21 is adjusted in the design and production phases so that it coincides with the image plane center of the image sensor 32. However, they do not always coincide in reality because of limitations (such as accuracy etc.) on design and production. Accordingly, the LCU 22 obtains the optical center position of the optical system 21 from the position of the optical system 21. As an example of a method of obtaining the optical center position, there is a method in which the optical center position for each position of the optical system 21 is measured in advance in for example the design and production phases so that the LCU 22 holds the relationship between them as a table or an approximation formula, and the optical center position is obtained from the position of the optical system 21 on the basis of that table or the approximation formula.

In addition to the above, the LCU 22 also performs control etc. of an aperture (not shown) for example.

The camera body 3 includes a focal plane shutter (which will be referred to as a "shutter") 31, the image sensor 32, an image sensor driving actuator 33, the system controller 34, a blur correction microcomputer 35, a Roll angular velocity sensor 36 and an SW (Switch) unit 37.

The shutter 31 is disposed in front of the image sensor 32 and opens or closes the shutter under control of the system controller 34 so as to bring the image plane of the image sensor 32 into an exposed state or a light-shielded state.

The image sensor 32 is for example an image sensor such as a Charge Coupled Device (CCD) or a Complementary Metal Oxide Semiconductor (CMOS), etc. The image sensor 32 converts, under control of the system controller 34, a subject image formed on the image plane into an electric signal (photoelectric conversion). An electric signal obtained by the conversion is read as an image signal by the system controller 34.

The image sensor driving actuator 33 has a configuration of supporting the image sensor 32, translates the image sensor 32 in the X and Y directions under control of the blur correction microcomputer 35, and causes the image sensor 32 to move rotationally about the image plane center of the image sensor 32. Note that the image sensor driving actuator 33 will be explained in detail by referring to FIG. 5.

The system controller 34 performs control of the overall operations of the camera body 3 and the camera 1 in addition to communications with the LCU 22 via the contact point 4 and with the blur correction microcomputer 35. For example, the system controller 34 controls the focusing and zooming in cooperation with the LCU 22. Also, for example, the system controller 34 controls the shutter 31 and the image sensor 32. Also, for example, system controller 34 reads an image signal from the image sensor 32 so as to convert it into image data in a prescribed format. Also, for example, the system controller 34 receives the optical center position of the optical system 21 transmitted from the LCU 22 so as to transmit it to the blur correction microcomputer 35. Also, for example, the system controller 34 transmits instruction signals for starting and terminating a blur correction to the blur correction microcomputer 35. Also, for example, the system controller 34 receives an instruction signal transmitted from the SW unit 37 so as to perform a process in accordance with the instruction signal (such as a photography process in accordance with a photography instruction signal). The system controller 34 includes a processor (CPU for example) that performs a computation process for controlling the overall operations of the camera body 3 and the camera 1 and an electronic circuit.

The blur correction microcomputer 35 receives instruction signals for starting and terminating a blur correction from the system controller 34. On the basis of an output of the Roll angular velocity sensor 36, the optical center position of the optical system 21 transmitted from the system controller 34 and the rotation center position of the image sensor 32 (which is also the image plane center), the blur correction microcomputer 35 controls the image sensor driving actuator 33 so that the image sensor 32 moves in a direction of cancelling an image blur. The blur correction microcomputer 35 includes a processor (CPU for example) that performs a computation process for performing the above operations and an electronic circuit. Note that the blur correction microcomputer 35 will be explained in detail later by refereeing to FIG. 6.

The Roll angular velocity sensor 36 detects the rotation angular velocity in the Roll directions.

The SW unit 37 is a manipulation unit for receiving various types of instructions from the user, and transmits an instruction signal in accordance with an instruction (photography instruction signal in accordance with an photography instruction for example) received from the user to the system controller 34.

Figure 5:
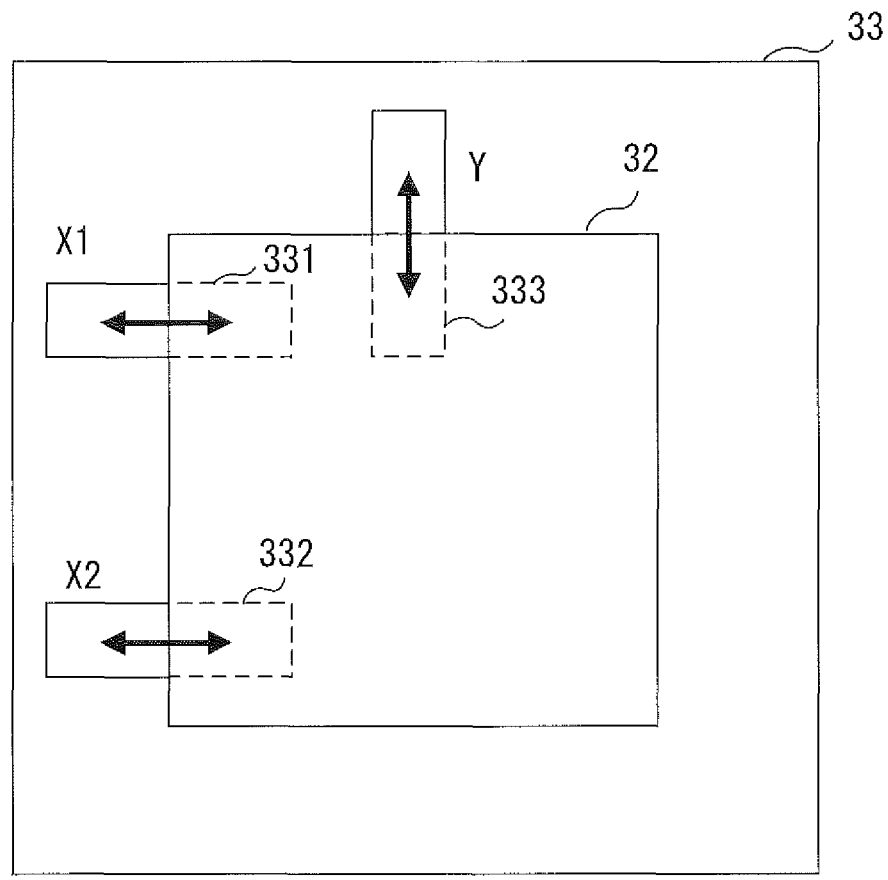
FIG. 5 schematically shows a configuration example of an image sensor driving actuator according to the first embodiment.

FIG. 5 schematically shows a configuration example of the image sensor driving actuator 33.

As shown in FIG. 5, the image sensor driving actuator 33 includes an X1 driving actuator 331, an X2 driving actuator 332 and a Y driving actuator 333.

The X1 driving actuator 331 and the X2 driving actuator 332 cooperatively move the image sensor 32 in the X directions and also cause it to move rotationally. When for example the image sensor 32 is to be moved in the X directions, the same driving amounts with the same sign are given as the driving amounts of the X1 driving actuator 331 and the X2 driving actuator 332. When the image sensor 32 is to be rotated, the same driving amounts with different signs are given as the driving amounts of the X1 driving actuator 331 and the X2 driving actuator 332.

The Y driving actuator 333 moves the image sensor 32 in the Y directions.

FIG. 6 shows an internal configuration example of the blur correction microcomputer 35.

As shown in FIG. 6, the blur correction microcomputer 35 includes an ADC (Analog-to-digital converter) 351, a communication unit 352, a correction amount calculation unit 353 and a motor driver 354.

The ADC 351 sequentially converts analog signals output from the Roll angular velocity sensor 36 into digital signals at a prescribed sampling rate so as to output them.

The communication unit 352 communicates with the system controller 34. For example, the communication unit 352 receives instruction signals for starting and terminating a blur correction transmitted from the system controller 34. Also, the communication unit 352 for example receives the optical center position of the optical system 21 transmitted from the system controller 34.

On the basis of an output of the ADC 351, the optical center position of the optical system 21 received by the communication unit 352 and the rotation center position of the image sensor 32 (which is also the image plane center), the correction amount calculation unit 353 calculates a target drive position (X1, X2, Y) of the image sensor driving actuator 33 for moving the image sensor 32 in a direction of cancelling an image blur. X1 is a target drive position of the X1 driving actuator 331, X2 is a target drive position of the X2 driving actuator 332 and Y is a target drive position of the Y driving actuator 333.

In more detail, the correction amount calculation unit 353 includes a Roll correction amount calculation unit 3531, a correction rotation center error calculation unit 3532, a correction rotation center error compensation amount calculation unit 3533 and a target drive position calculation unit 3534, and these units perform the processes as below.

The Roll correction amount calculation unit 3531 calculates the angular displacement amount in the Roll directions from the start of a blur correction on the basis of an output from the ADC 351, and outputs that angular displacement amount as the rotation blur correction amount (θ) in the Roll directions. Note that the Roll correction amount calculation unit 3531 will be explained in detail later by referring to FIG. 7.

The correction rotation center error calculation unit 3532 calculates a positional shift amount (correction rotation center error) between the optical center position of the optical system 21 received by the communication unit 352 and the rotation center position of the image sensor 32.

On the basis of a calculation result of the correction rotation center error calculation unit 3532 (correction rotation center error) and a calculation result of the Roll correction amount calculation unit 3531 (rotation blur correction amount), the correction rotation center error compensation amount calculation unit 3533 calculates correction rotation center error compensation amounts (Xc, Yc) in the X directions and the Y directions for compensating the correction rotation center error. Note that this calculation method will later be explained in detail by referring to S15 in FIG. 8.

On the basis of a calculation result (correction rotation center error compensation amount) of the correction rotation center error compensation amount calculation unit 3533 and a calculation result (rotation blur correction amount) of the Roll correction amount calculation unit 3531, the target drive position calculation unit 3534 calculates a target drive position (X1, X2, Y) of the image sensor driving actuator 33 for moving the image sensor 32 in a direction of cancelling an image blur.

In accordance with a calculation result of the target drive position calculation unit 3534 (target drive position of the image sensor driving actuator 33), the motor driver 354 outputs a drive pulse signal to each of the X1 driving actuator 331, the X2 driving actuator 332 and the Y driving actuator 333 of the image sensor driving actuator 33.

FIG. 7 shows an internal configuration example of the Roll correction amount calculation unit 3531.

As shown in FIG. 7, the Roll correction amount calculation unit 3531 has an integrator 35311.

The integrator 35311 performs time integration on an output of the ADC 351 so as to calculate an angular displacement amount in the Roll directions (image plane rotation amount) from the start of the blur correction, and outputs it to the rotation blur correction amount in the Roll directions.

Next, explanations will be given for an image blur correction operation of the camera 1 according to the present embodiment.

Figure 8:
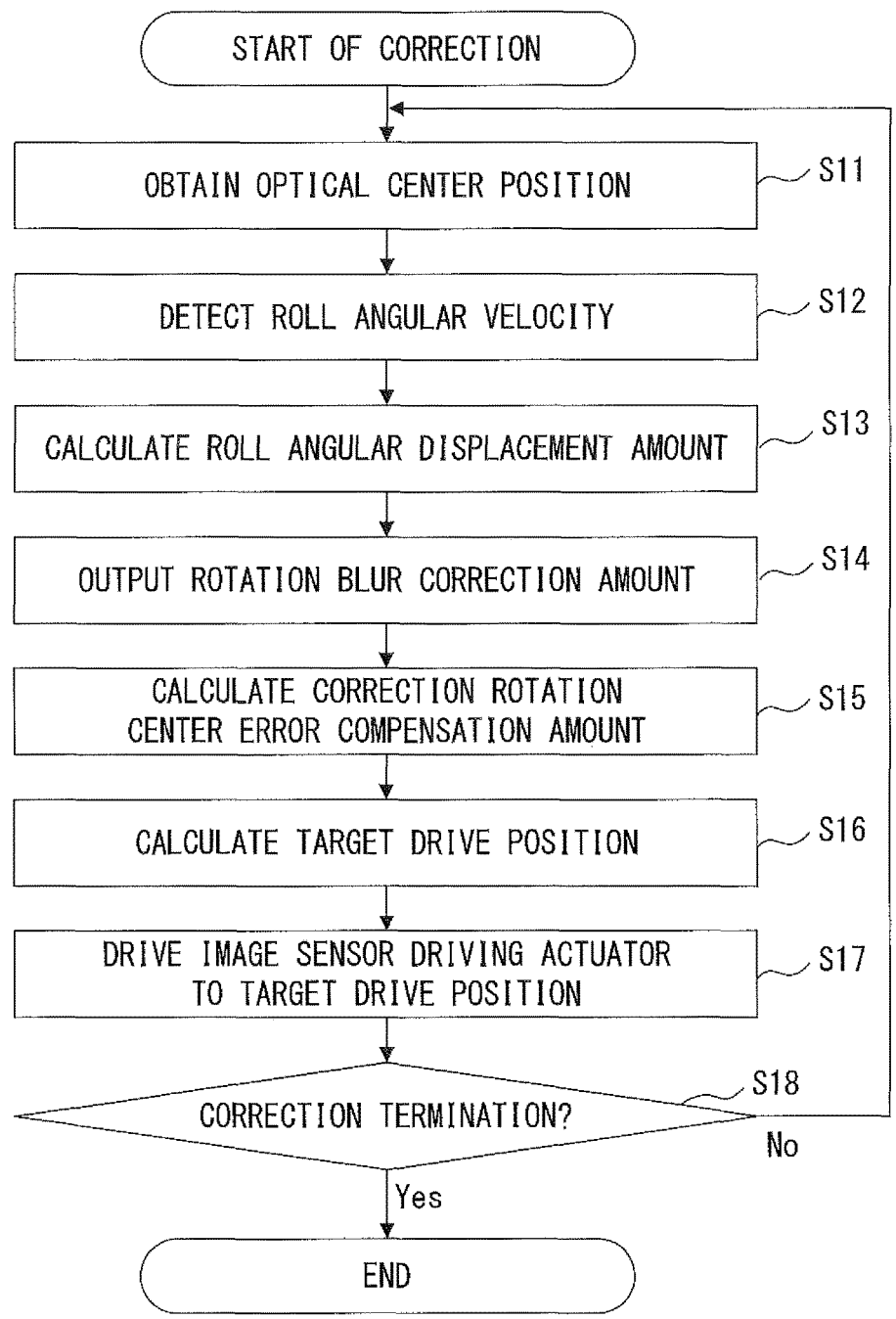
FIG. 8 is a flowchart showing an example of an image blur correction operation of the camera according to the first embodiment.

FIG. 8 is a flowchart showing an example of that operation.

Note that this operation is an operation started upon the reception, by the blur correction microcomputer 35, of a blur correction start instruction signal transmitted from the system controller 34.

As shown in FIG. 8, upon the start of this operation, the blur correction microcomputer 35 obtains (receives) an optical center position (Xo, Yo) of the optical system 21 transmitted from the LCU 22 via the system controller 34 (S11).

Next, on the basis of a rotation angular velocity in the Roll directions that was detected by the Roll angular velocity sensor 36 (S12) and converted into a digital signal by the ADC 351, the Roll correction amount calculation unit 3531 calculates a angular displacement amount in the Roll directions from the start of the blur correction (S13) and outputs the angular displacement amount as a rotation blur correction amount (θ) in the Roll directions (S14).

Next, the correction rotation center error calculation unit 3532 calculates a positional shift amount (correction rotation center error) between the optical center position (Xo, Yo) obtained in S11 and the rotation center position (Xr, Yr) of the image sensor 32, and the correction rotation center error compensation amount calculation unit 3533 calculates the correction rotation center error compensation amounts (Xc, Yc) in the X and Y directions for compensating the correction rotation center error by using equation (1) below on the basis of the correction rotation center error and the rotation blur correction amount (θ) output in S14 (S15).

$$Xc = \sqrt{(Xr-Xo)^2 + (Yr-Yo)^2} \cdot \cos(\theta + \Delta\theta) - (Xr - Xo)$$

$$Yc = \sqrt{(Xr-Xo)^2 + (Yr-Yo)^2} \cdot \sin(\theta + \Delta\theta) - (Yr - Yo)$$

ただし, $\Delta\theta = \tan^{-1}((Yr-Yo)/(Xr-Xo))$  Equation (1)

Next, on the basis of the correction rotation center error compensation amounts (Xc, Yc) in the X and Y directions calculated in S15 and the rotation blur correction amount (θ) output in S14, the target drive position calculation unit 3534 calculates the target drive position (X1, X2, Y) of the image sensor driving actuator 33 for moving the image sensor 32 in a direction of cancelling an image blur (S16).

Next, the motor driver 354, on the basis of the target drive position (X1, X2, Y) of the image sensor driving actuator 33 calculated in S16, outputs a drive pulse signal to each of the X1 driving actuator 331, the X2 driving actuator 332 and the Y driving actuator 333 of the image sensor driving actuator 33 (S17). Thereby, the X1 driving actuator 331, the X2 driving actuator 332 and the Y driving actuator 333 are driven to the target drive position so that an image blur correction is performed.

Next, the blur correction microcomputer 35 determines whether or not the image blur correction is terminated (whether or not a blur correction termination instruction signal has been received from the system controller 34) (S18), and the process returns to S11 when the determination result is NO. However, when there has not been a change in the position of the optical system 21 after the last process in S11, the process may return to S12 instead of S11 because there is not a change in the optical center position of the optical system 21, either.

When the determination result in S18 is YES, the present operation is terminated.

As described above, according to the camera 1 of the present embodiment, it is possible to accurately correct an image blur caused by a change in the orientation in the Roll directions of the camera 1 even when a design or production limitation (such as accuracy etc.) of the camera 1 has caused noncoincidence between the optical center of the optical system. 21 and the rotation center (image plane center) of the image sensor 32.

Second Embodiment

The camera 1 according to the second embodiment is a camera having a function of correcting an image blur caused by a change in the orientation in the Yaw directions, the Pitch directions and the Roll directions of the camera 1.

Figure 9:
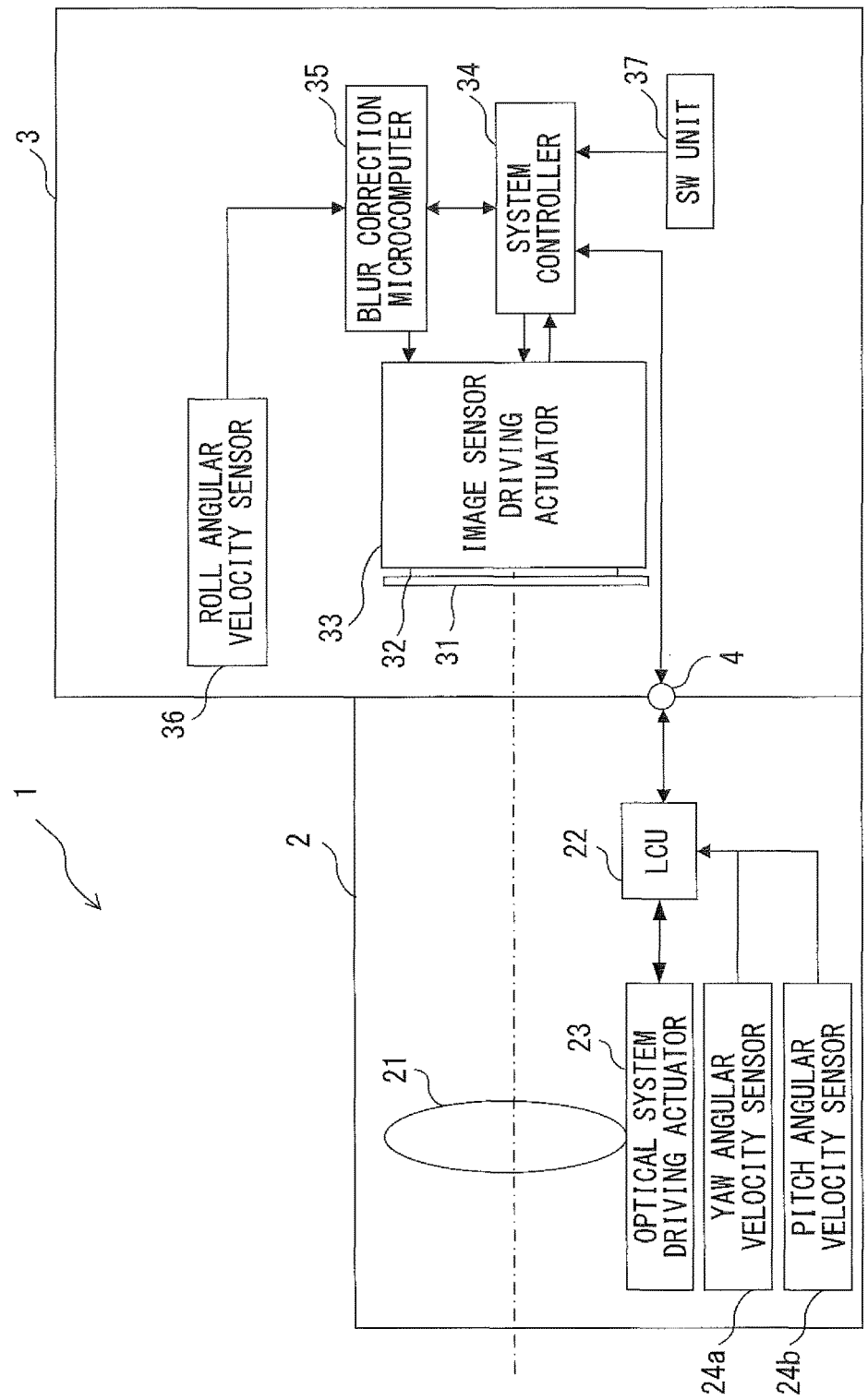
FIG. 9 shows a configuration example of a camera according to a second embodiment.

FIG. 9 shows a configuration example of the camera 1 according to the present embodiment.

Note that in the camera 1 according to the present embodiment, the same constituents as those in the camera 1 of the first embodiment will be given the same symbols for explanations.

As shown in FIG. 9, the camera 1 of the present embodiment has a configuration in which the interchangeable lens 2 is mounted on the camera body 3, similarly to the camera 1 of the first embodiment, and can communicate with both of them via the contact point 4.

The interchangeable lens 2 includes the optical system 21, the LCU 22, the optical system driving actuator 23, a Yaw angular velocity sensor 24a and a Pitch angular velocity sensor 24b.

The optical system 21 has a focus lens, a zoom lens and a lens group for image blur correction (which will be referred to as a correcting lens hereinafter) (not shown).

Under control of the LCU 22, the optical system driving actuator 23 moves a focus lens and a zoom lens included in the optical system 21 in the optical axis directions and also translates the correcting lens included in the optical system 21 in the directions orthogonal to the optical axis directions. Thereby, focusing and zooming is conducted and the optical axis directions of the optical system 21 is shifted.

The LCU 22 communicates with the system controller 34 via the contact point 4 and controls the overall operations of the interchangeable lens 2. For example, the LCU 22 controls the optical system driving actuator 23 in cooperation with the system controller 34 so as to control the focusing and zooming. Also, for example, the LCU 22 receives instruction signals transmitted from the system controller 34 for starting and terminating a blur correction. Also, for example, the LCU 22 receives the rotation center position (image plane center position) of the image sensor 32 and the rotation blur correction amount in the Roll directions transmitted from the system controller 34. Also, for example, on the basis of the rotation center position of the image sensor 32, the rotation blur correction amount in the Roll directions, an output of the Yaw angular velocity sensor 24a and an output of the Pitch angular velocity sensor 24b, the LCU 22 controls the optical system driving actuator 23 so that the correcting lens moves in a direction of cancelling an image blur. Also, for example, the LCU 22 monitors the position of the optical system 21 so as to obtain the optical center position of the optical system 21 from that position of the optical system 21.

Note that in the camera 1 of the present embodiment, because a movement of the correcting lens included in the optical system 21 shifts the optical center of the optical system 21, the optical center of the optical system 21 and the image plane center of the image sensor 32 do not always coincide. Accordingly, the LCU 22 obtains the optical center position of the optical system 21 from the position of the optical system 21. As an example of a method of obtaining the optical center position, there is a method, similarly to the case of the camera 1 of the present embodiment, in which the optical center position for each position of the optical system 21 is measured in advance in for example the design and production phases so that the LCU 22 holds the relationship between them as a table or an approximation formula, and the optical center position is obtained from the position of the optical system 21 on the basis of that table or the approximation formula.

In addition to the above, the LCU 22 also performs control etc. of an aperture (not shown) for example. Note that the LCU 22 of the present embodiment will later be described in detail by referring to FIG. 11.

The Yaw angular velocity sensor 24a detects a rotation angular velocity in the Yaw directions.

The Pitch angular velocity sensor 24b detects a rotation angular velocity in the Pitch directions.

Note that in the camera 1 of the present embodiment, while the Yaw angular velocity sensor 24a, the Pitch angular velocity sensor 24b and the Roll angular velocity sensor 36 are angular velocity sensors having the same configuration, they are mounted in different directions due to differences in detection directions of rotation angular velocities.

Similarly to the camera 1 of the first embodiment, the camera body 3 includes the shutter 31, the image sensor 32, the image sensor driving actuator 33, the system controller 34, the blur correction microcomputer 35, the Roll angular velocity sensor 36 and the SW unit 37.

Because the shutter 31, the image sensor 32, the Roll angular velocity sensor 36 and the SW unit 37 are similar to those in the camera 1 of the first embodiment, and explanations thereof will be omitted here.

The image sensor driving actuator 33 has a configuration of supporting the image sensor 32, and moves the image sensor 32 rotationally about the image plane center of the image sensor 32 under control of the blur correction microcomputer 35. In such a case, the image sensor driving actuator 33 may be treated as a result of omitting the Y driving actuator 333 from the configuration shown in FIG. 5 for example. In such a case, the rotational movement scope of the image sensor 32 can be expanded for the space from which the Y driving actuator 333 is omitted.

The system controller 34 communicates with the LCU 22 via the contact point 4 and the blur correction microcomputer 35 and also controls overall operations of the camera body 3 and the camera 1. For example, the system controller 34 controls the focusing and zooming in cooperation with the LCU 22. Also, for example, the system controller 34 controls the shutter 31 and the image sensor 32. Also, for example, the system controller 34 reads an image signal from the image sensor 32 so as to convert it into image data in a prescribed format. Also, for example, the system controller 34 receives the rotation center position (image plane center position) of the image sensor 32 and the rotation blur correction amount in the Roll directions transmitted from the blur correction microcomputer 35, and transmits them to the LCU 22. Also, for example, the system controller 34 transmits instruction signals for starting and terminating a blur correction to the blur correction microcomputer 35 and the LCU 22. Also, for example, the system controller 34 receives an instruction signal transmitted from the SW unit 37 and performs a process in accordance with that instruction signal (such as a photography process in accordance with a photography instruction signal).

The blur correction microcomputer 35 receives instruction signals for starting and terminating a blur correction transmitted from the system controller 34. On the basis of an output of the Roll angular velocity sensor 36, the blur correction microcomputer 35 controls the image sensor driving actuator 33 so as to move the image sensor 32 rotationally in a direction of cancelling an image blur. Also, the blur correction microcomputer 35 transmits the rotation center position of the image sensor 32 and the rotation blur correction amount in the Roll directions to the system controller 34.

Figure 10:
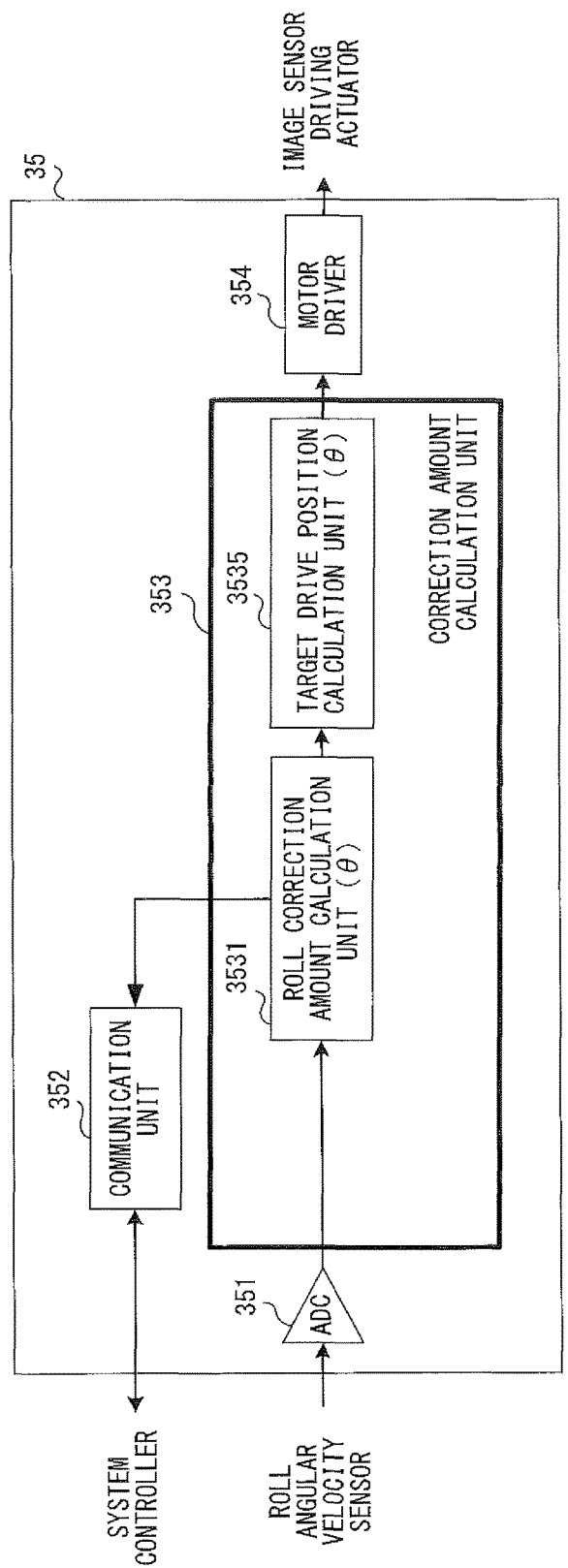
FIG. 10 shows an internal configuration example of a blur correction microcomputer according to the second embodiment.

FIG. 10 shows an internal configuration example of the blur correction microcomputer 35 of the present embodiment.

As shown in FIG. 10, the blur correction microcomputer 35, similarly to the camera 1 of the first embodiment, includes the ADC 351, the communication unit 352, the correction amount calculation unit 353 and the motor driver 354.

The ADC 351 is similar to that of the camera 1 of the first embodiment, and the explanations thereof will be omitted here.

The communication unit 352 communicates with the system controller 34. For example, the communication unit 352 receives instruction signals for starting and terminating a blur correction transmitted from the system controller 34. Also, the communication unit 352 for example transmits the rotation center position (image plane center position) of the image sensor 32 and the calculation result (rotation blur correction amount) of the Roll correction amount calculation unit 3531 to the system controller 34.

On the basis of an output of the ADC 351, the correction amount calculation unit 353 calculates a target drive position (θ) of the image sensor driving actuator 33 for moving the image sensor 32 rotationally in a direction of cancelling an image blur.

In more detail, the correction amount calculation unit 353 includes the Roll correction amount calculation unit 3531 and a target drive position calculation unit 3535, and these units perform the processes as below.

The Roll correction amount calculation unit 3531 is similar to that of the camera 1 of the first embodiment, and the explanations thereof will be omitted here.

On the basis of a calculation result (rotation blur correction amount) of the Roll correction amount calculation unit 3531, the target drive position calculation unit 3535 calculates a target drive position (θ) of the image sensor driving actuator 33 for moving the image sensor 32 rotationally in a direction of cancelling an image blur.

The motor driver 354 outputs a drive pulse signal to the image sensor driving actuator 33 in accordance with the calculation result of the target drive position calculation unit 3534 (the target drive position of the image sensor driving actuator 33).

FIG. 11 shows an internal configuration example of the LCU 22 of the present embodiment.

As shown in FIG. 11, the LCU 22 includes an ADC221*a*, an ADC221*b*, a communication unit 222, a correction amount calculation unit 223 and a motor driver 224.

The ADC 221*a* sequentially converts analog signals output from the Yaw angular velocity sensor 24*a* into digital signals at a prescribed sampling rate so as to output them.

An ADC 221*b* sequentially converts analog signals output from the Pitch angular velocity sensor 24*b* into digital signals at a prescribed sampling rate so as to output them.

The communication unit 222 communicates with the system controller 34. For example, the communication unit 222 receives instruction signals for starting and terminating a blur correction transmitted from the system controller 34. Also, for example, the communication unit 352 receives the rotation center position (image plane center position) of the image sensor 32 and the rotation blur correction amount in the Roll directions transmitted from the system controller 34.

On the basis of an output of the ADC 221*a*, an output of the ADC 221*b*, the rotation center position (image plane center position) of the image sensor 32 and the rotation blur correction amount in the Roll directions received by the communication unit 222, the correction amount calculation unit 223 calculates a target drive position (Xt, Yt) of the optical system driving actuator 23 for moving the correcting lens in a direction of cancelling an image blur.

In more detail, the correction amount calculation unit 223 includes a Yaw displacement amount calculation unit 2231*a*, a Pitch displacement amount calculation unit 2231*b*, a Yaw/Pitch correction amount calculation unit 2232, a correction rotation center error calculation unit 2233, a correction rotation center error compensation amount calculation unit 2234, a target position calculation unit 2235 and a target position conversion unit 2236, and these units the following processes.

The Yaw displacement amount calculation unit 2231*a* calculates an angular displacement amount in the Yaw directions from the start of a blur correction on the basis of an output of the ADC 221*a*.

The Pitch displacement amount calculation unit 2231*b* calculates an angular displacement amount in the Pitch directions from the start of a blur correction on the basis of an output of the ADC 221*b*.

The Yaw/Pitch correction amount calculation unit 2232 calculates an image plane movement amount in the X directions from the start of a blur correction on the basis of a calculation result (angular displacement amount in the Yaw directions) of the Yaw displacement amount calculation unit 2231*a* and the focal length of the optical system 21, and outputs it as the blur correction amount in the X directions. In addition to the above, the Yaw/Pitch correction amount calculation unit 2232 calculates an image plane movement amount in the Y directions from the start of a blur correction on the basis of a calculation result (angular displacement amount in the Pitch directions) of the Pitch displacement amount calculation unit 2231*b* and the focal length of the optical system 21, and outputs it as the blur correction amount in the Y directions.

Note that the Yaw displacement amount calculation unit 2231*a*, the Pitch displacement amount calculation unit 2231*b* and the Yaw/Pitch correction amount calculation unit 2232 will later be described in detail by referring to FIG. 12.

The correction rotation center error calculation unit 2233 calculates a positional shift amount (correction rotation center error) between a position as a result of moving the rotation center position of the image sensor 32 received by the communication unit 352 by the length corresponding to the blur correction amounts in the X and Y directions calculated by the Yaw/Pitch correction amount calculation unit 2232 and the optical center position of the optical system 21.

On the basis of a calculation result (correction rotation center error) of the correction rotation center error calculation unit 2233 and the rotation blur correction amount in the Roll directions received by the communication unit 352, the correction rotation center error compensation amount calculation unit 2234 calculates the correction rotation center error compensation amounts in the X and Y directions (Xc, Yc) for compensating for the correction rotation center error. Note that this calculation method will be explained in detail by referring to S35 in FIG. 13, which will be described later.

The target position calculation unit 2235 adds a calculation result of the Yaw/Pitch correction amount calculation unit 2232 (blur correction amounts in the X and Y directions) and a calculation result of the correction rotation center error compensation amount calculation unit 2234 (correction rotation center error compensation amount in the X and Y directions) so as to calculate a target position (Xa, Ya) of the correcting lens for moving the correcting lens in a direction of cancelling an image blur. Note that this calculation method will be explained in detail by referring to step S36 in FIG. 13, which will be described later.

The target position conversion unit 2236 converts a calculation result (target position of the correcting lens) of the target position calculation unit 2235 into a target drive position (Xt, Yt) of the optical system driving actuator 23.

The motor driver 224 outputs a drive pulse signal to the optical system driving actuator 23 in accordance with the calculation result of the target position conversion unit 2236 (the target drive position of the optical system driving unit 23).

Figure 12:
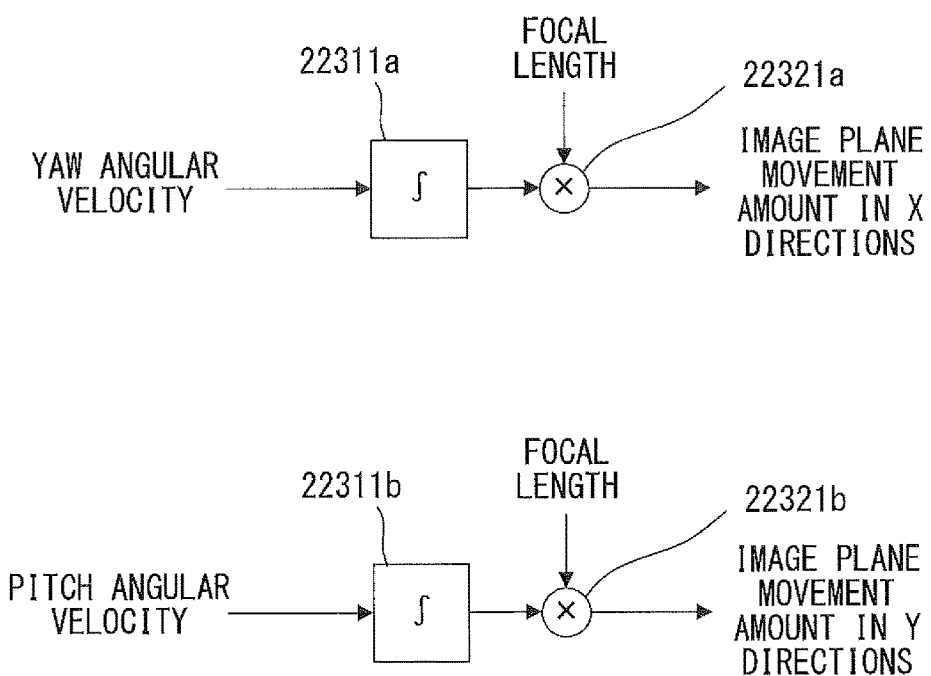
FIG. 12 shows configuration examples of a Yaw displacement amount calculation unit, a Pitch displacement amount calculation unit and a Yaw/Pitch correction amount calculation unit according to the second embodiment.

FIG. 12 shows configuration examples of the Yaw displacement amount calculation unit 2231a, the Pitch displacement amount calculation unit 2231b and the Yaw/Pitch correction amount calculation unit 2232.

As shown in FIG. 12, the Yaw displacement amount calculation unit 2231a, the Pitch displacement amount calculation unit 2231b and the Yaw/Pitch correction amount calculation unit 2232 include an integrator 22311a, an integrator 22311b, a multiplier 22321a and a multiplier 22321b. Note that the integrator 22311a is included in the Yaw displacement amount calculation unit 2231a, the integrator 22311b is included in the Pitch displacement amount calculation unit 2231b, the multipliers 22321a and 22321b are included in the Yaw/Pitch correction amount calculation unit 2232.

The integrator 22311a performs time integration on an output of the ADC 221a so as to calculate an angular displacement amount in the Yaw directions from the start of the blur correction.

The multiplier 22321a multiplies a calculation result (angular displacement amount in the Yaw directions from the start of the blur correction) of the integrator 22311a by the focal length of the optical system 21 so as to calculate the image plane movement amount in the X directions from the start of the blur correction, and outputs it as the blur correction amount in the X directions.

The integrator 22311b performs time integration on an output of the ADC 221b so as to calculate the angular displacement amount in the Pitch directions from the start of the blur correction.

The multiplier 22321b multiplies a calculation result (angular displacement amount in the Pitch directions from the start of the blur correction) of the integrator 22311b by the focal length of the optical system 21 so as to calculate the image plane movement amount in the Y directions from the start of the blur correction, and outputs it as the blur correction amount in the Y directions.

Note that in the camera 1 of the present embodiment having the above configuration, the camera 1 is an example of an imaging apparatus. The optical system 21 is an example of an optical system that forms a subject image. The image sensor 32 is an example of an image sensor that performs photoelectric conversion on a subject image formed by the optical system. The image sensor driving actuator 33 is an example of a first driving actuator that translates and moves the image sensor rotationally. The optical system driving actuator 23 is an example of a second driving actuator that translates an image blur correction lens included in the optical system. The Roll angular velocity sensor 36 is an example of a first angular velocity detector for detecting a first rotation angular velocity with respect to the optical axis directions of the optical system as the rotation axis. The Yaw angular velocity sensor 24a is an example of a second angular velocity detector for detecting a second rotation angular velocity with respect to the first directions, which is orthogonal to the optical axis directions of the optical system, as the rotation axis. The Pitch angular velocity sensor 24b is an example of a third angular velocity detector for detecting a third rotation angular velocity with respect to the second directions, which is orthogonal to the first directions, as the rotation axis. The LCU 22 and the blur correction microcomputer 35 are examples of an image blur correction control unit for controlling the first driving actuator so that the first driving actuator both performs translation and rotational movements, on the basis of a first rotation angular velocity detected by the first angular velocity detector, a second rotation angular velocity detected by the second angular velocity detector, a third rotation angular velocity detected by the third angular velocity detector, the optical center position of the optical system and the rotation center position of the image sensor.

Next, explanations will be given for an image blur correction of the camera 1 of the present embodiment.

FIG. 13 is a flowchart showing an example of the above operation.

Note that this operation is an operation started upon the reception, by the blur correction microcomputer 35 and the LCU 22, of a blur correction start instruction signal transmitted from the system controller 34. Also, in FIG. 13, the left flowchart shows the control operation of the blur correction microcomputer 35 and the right flowchart shows the control operation of the LCU 22.

As shown in FIG. 13, upon the start of this operation, in the blur correction microcomputer 35, the Roll correction amount calculation unit 3531 calculates an angular displacement amount in the Roll directions from the start of a blur correction (S22) on the basis of a rotation angular velocity in the Roll directions detected by the Roll angular velocity sensor 36 (S21) converted into a digital signal by the ADC 351, and outputs the angular displacement amount as the rotation blur correction amount ($\theta$) in the Roll directions (S23).

Next, the blur correction microcomputer 35 outputs that rotation blur correction amount ($\theta$) in the Roll directions and the rotation center position (image plane center position) (Xr, Xr) of the image sensor 32 to the LCU 22 via the system controller 34 (S24).

Next, on the basis of the rotation blur correction amount ($\theta$) output in S23, the target drive position calculation unit 3535 calculates a target drive position ($\theta$) of the image sensor driving actuator 33 for moving the image sensor 32 rotationally in a direction of cancelling an image blur (S25).

Next, the motor driver 354 outputs a drive pulse signal to the image sensor driving actuator 33 in accordance with the target drive position ($\theta$) of the image sensor driving actuator 33 calculated in S25 (S26). Thereby, the image sensor driving actuator 33 is driven to the target drive position so that a rotation blur correction is performed.

Next, the blur correction microcomputer 35 determines whether or not the image blur correction is terminated (whether or not a blur correction termination instruction signal has been received from the system controller 34) (S27). The process returns to S21 when the determination result is NO, and when the determination result is YES, the control operation of the blur correction microcomputer 35 is terminated.

Meanwhile, in the LCU 22, the optical center position (Xo, Yo) of the optical system 21, the rotation blur correction amount ($\theta$) in the Roll directions and the rotation center position (Xr, Yr) of the image sensor 32 transmitted via the system controller 34 from the blur correction microcomputer 35 in S24 are obtained (S31).

Next, on the basis of the rotation angular velocities in the Yaw and Pitch directions detected by the Yaw angular velocity sensor 24a and the Pitch angular velocity sensor 24b (S32) and converted into digital signals by the ADC 221a and the ADC 221b, the Yaw displacement amount calculation unit 2231a and the Pitch displacement amount calculation unit 2231b calculate angular displacement amounts in the Yaw and Pitch directions from the start of the blur correction (S33).

Next, on the basis of the angular displacement amount in the Yaw direction calculated in S33 and the focal length of the optical system 21, the Yaw/Pitch correction amount calculation unit 2232 calculates an image plane movement amount in the X directions from the start of the blur correction as a blur correction amount in the X direction (X), and calculates an image plane movement amount in the Y directions from the start of the blur correction on the basis of the angular displacement amount in the Pitch directions calculated in S33 and the focal length of the optical system 21 (S34).

Next, the correction rotation center error calculation unit 2233 calculates a positional shift amount (correction rotation center error) between a position as a result of moving the rotation center position (Xr, Yr) of the image sensor 32 obtained in S31 by the length corresponding to the blur correction amounts in the X and Y directions (X, Y) calculated in S34 and the optical center position (Xo, Yo) of the optical system 21, and the correction rotation center error compensation amount calculation unit 2234 calculates the correction rotation center error compensation amounts (Xc, Yc) in the X directions and the Y directions for compensating the correction rotation center error, by using equation (2) below on the basis of that correction rotation center error and rotation blur correction amount (θ) obtained in S31 (S35).

$$Xc = \sqrt{((Xr+X)-Xo)^2+((Yr+Y)-Yo)^2} \cdot \cos(\theta+\Delta\theta)-((Xr+X)-Xo)$$

$$Yc = \sqrt{((Xr+X)-Xo)^2+((Yr+Y)-Yo)^2} \cdot \sin(\theta+\Delta\theta)-((Yr+Y)-Yo)$$

ただし, $\Delta\theta = \tan^{-1}(((Yr+Y)-Yo)/((Xr+X)-Xo))$    Equation (2)

The target position calculation unit 2235 adds the blur correction amounts (X, Y) in the X and Y directions calculated in S34 and the correction rotation center error compensation amounts (Xc, Yc) in the X and Y directions calculated in S35 so as to calculate a target position (Xa, Ya) of the correcting lens for moving the correcting lens in a direction of cancelling an image blur by using equation (3) below, and the target position conversion unit 2236 converts that target position (Xa, Ya) of the correcting lens into a target drive position (Xt, Yt) of the optical system driving actuator 23 (S36).

$$Xa = X + Xc = \sqrt{((Xr+X)-Xo)^2+((Yr+Y)-Yo)^2} \cdot \cos(\theta+\Delta\theta)-Xr+Xo$$

$$Ya = Y + Yc = \sqrt{((Xr+X)-Xo)^2+((Yr+Y)-Yo)^2} \cdot \sin(\theta+\Delta\theta)-Yr+Yo$$    Equation (3)

Next, the motor driver 224 outputs a drive pulse signal to the optical system driving actuator 23 in accordance with the target drive position (Xt, Yt) of the optical system driving actuator 23 that was converted in S36 (S37). Thereby, the optical system driving actuator 23 is driven to the target drive position so that an angular blur in the Yaw/Pitch directions and an image blur caused by the correction rotation center errors in the X and Y directions due to the rotation blur in the Roll directions are corrected.

Next, the LCU 22 determines whether or not the image blur correction is terminated (whether or not a blur correction termination instruction signal has been received from the system controller 34) (S38), and the process returns to S31 when the determination result is NO, and the control operation of the LCU 22 is terminated when the determination result is YES.

As described above, according to the camera 1 of the present embodiment, it is possible to accurately correct an image blur caused by a change in the orientation in the Roll directions of the camera 1 not to mention an image blur caused by a change in the orientation in the Yaw and Pitch directions of the camera 1 even when a movement of the correcting lens included in the optical system 21 has caused the optical center of the optical system 21 to shift, resulting in noncoincidence between the optical center of the optical system 21 and the image plane center of the image sensor 32.

Also, in the camera 1 of the present embodiment, it is sufficient if only a driving mechanism for moving the image sensor 32 rotationally is provided as a driving mechanism for the image sensor 32, making it possible to expand the rotational movement scope of the image sensor 32 for the space of the driving mechanism for translating the image sensor 32.

While the camera 1 of the first and second embodiments has been explained above, the camera 1 of the respective embodiments can receive various modifications.

For example, in the camera 1 of the first embodiment, one lens group included in the optical system 21 may bear the roles of both the focus lens and the zoom lens.

Also, for example, in the camera 1 of the second embodiment, one lens group included in the optical system 21 may bear two or more roles of the focus lens, the zoom lens and the correcting lens.

Also, in the camera 1 of the first and second embodiments, the optical system 21 does not have to include a zoom lens. In such a case, it becomes unnecessary to move the zoom lens by using the optical system driving actuator 23 and it also becomes unnecessary to control zooming, which is conducted by the LCU 22 in cooperation with the system controller 34.

Also, in the camera 1 of the first and second embodiments, focusing and zooming may be conducted manually in the interchangeable lens 2. In such a case, it becomes unnecessary to move the focus lens or the zoom lens by using the optical system driving actuator 23 and it also becomes unnecessary to control focusing or zooming, which is conducted by the LCU 22 in cooperation with the system controller 34.

Also, when the optical center of the optical system 21 is shifted by an operation of an aperture (not shown) in the camera 1 of the first and second embodiments, it is possible to employ a configuration in which the LCU 22 holds relationships between aperture operations, the positions of the optical system 21 and the optical center positions of the optical system 21 in a form of an approximation formula or a table so that the optical center position is obtained from the position of the optical system 21 and the aperture operation on the basis of the approximation formula or the table.

Also, in the camera 1 according to the first embodiment, the camera body 3 may further include a Yaw angular velocity sensor and a Pitch angular velocity sensor. In such a case, the blur correction microcomputer 35 may be configured so that also an image blur caused by a change in the orientation in the Yaw directions and the Pitch directions of the camera 1 is corrected by the drive control of the image sensor driving actuator 33.

As described above, according to the present embodiment, an image blur caused by a change in the orientation in the Roll directions of an imaging apparatus can be corrected highly accurately even when the optical center of the optical system and the rotation center of the image sensor do not coincide.

The above embodiments are just for providing specific examples of the present invention for better understanding of the present invention, and the present invention is not limited to the above embodiments. The present invention may receive various modifications and changes without departing from the spirit of the present invention defined in the claims.

What is claimed is:

1. An imaging apparatus comprising:
an optical system configured to form a subject image;
an image sensor configured to perform photoelectric conversion on a subject image formed by the optical system;
a first driving actuator configured to cause translation and a rotational movement of the image sensor;
a second driving actuator configured to cause translation of an image blur correction lens included in the optical system;
a first angular velocity detector configured to detect a first rotation angular velocity with respect to optical axis directions of the optical system as a rotation axis;
a second angular velocity detector configured to detect a second rotation angular velocity with respect to first directions, which are orthogonal to optical axis directions of the optical system, as a rotation axis;
a third angular velocity detector configured to detect a third rotation angular velocity with respect to second directions, which are orthogonal to the first directions, as a rotation axis; and
an image blur correction control unit that includes:
an image blur correction amount calculation unit configured to calculate a first image blur correction amount on the basis of the first rotation angular velocity detected by the first angular velocity detector;
a positional shift amount calculation unit configured to calculate a positional shift amount between the optical center position of the optical system and the rotation center position of the image sensor; and
a positional shift compensation amount calculation unit configured to calculate a positional shift compensation amount in first directions, which are orthogonal to optical axis directions of the optical system, and a positional shift compensation amount in second directions, which are orthogonal to the first directions, on the basis of an image blur correction amount calculated by the image blur correction amount calculation unit and a positional shift amount calculated by the positional shift amount calculation unit, wherein
the image blur correction control unit;
controls the first driving actuator so that the first driving actuator causes the rotational movement, on the basis of the first image blur correction amount calculated by the image blur correction amount calculation unit, and
controls the first driving actuator so that the first driving actuator causes the translation, on the basis of the positional shift compensation amount in the first directions and the positional shift compensation amount in the second directions calculated by the positional shift compensation amount calculation unit, and
the optical center position of the optical system is changed on the basis of the translation of the image blur correction lens.

2. An imaging apparatus comprising:
an optical system configured to form a subject image;
an image sensor configured to perform photoelectric conversion on a subject image formed by the optical system;
a first driving actuator configured to cause translation and a rotational movement of the image sensor;
a second driving actuator configured to cause translation of an image blur correction lens included in the optical system;
a first angular velocity detector configured to detect a first rotation angular velocity with respect to optical axis directions of the optical system as a rotation axis;
a second angular velocity detector configured to detect a second rotation angular velocity with respect to first directions, which are orthogonal to optical axis directions of the optical system, as a rotation axis;
a third angular velocity detector configured to detect a third rotation angular velocity with respect to second directions, which are orthogonal to the first directions, as a rotation axis; and
an image blur correction control unit that includes:
a first image blur correction amount calculation unit configured to calculate a first image blur correction amount on the basis of the first rotation angular velocity detected by the first angular velocity detector;
a second image blur correction amount calculation unit configured to calculate a second image blur correction amount on the basis of the second rotation angular velocity detected by the second angular velocity detector and a focal length of the optical system and to calculate a third image blur correction amount on the basis of the third rotation angular velocity detected by the third angular velocity detector and a focal length of the optical system;
a positional shift amount calculation unit configured to calculate a positional shift amount between a position as a result of moving the rotation center position of the image sensor by a length corresponding to the second image blur correction amount and the third image blur correction amount calculated by the second image blur correction amount calculation unit and the optical center position of the optical system; and
a positional shift compensation amount calculation unit configured to calculate a positional shift compensation amount in the first directions and a positional shift compensation amount in the second directions on the basis of the first image blur correction amount calculated by the first image blur correction amount calculation unit and the positional shift amount calculated by the positional shift amount calculation unit, wherein
the image blur correction control unit;
controls the second driving actuator so that the second driving actuator causes the translation, on the basis of the second image blur correction amount and the third image blur correction amount calculated by the second image blur correction amount calculation unit, and
controls the first driving actuator so that the first driving actuator causes both the translation and the rotational movement, on the basis of the first image blur correction amount calculated by the first image blur correction amount calculation unit, the second image blur correction amount and the third image blur correction amount calculated by the second image blur correction amount calculation unit, the positional shift compensation amount in the first directions and the positional shift compensation amount in the second directions calculated by the positional shift compensation amount calculation unit, and the optical center position of the optical system is changed on the basis of the translation of the image blur correction lens.

3. An image blur correction method for an imaging apparatus including an optical system configured to form a subject image, an image sensor configured to perform photoelectric conversion on a subject image formed by the optical system, a first driving actuator configured to cause translation and a rotational movement of the image sensor, a second driving actuator configured to cause translation of an image blur correction lens included in the optical system, a first angular velocity detector configured to detect a first rotation angular velocity with respect to optical axis directions of the optical system as a rotation axis, a second angular velocity detector configured to detect a second rotation angular velocity with respect to first directions, which are orthogonal to optical axis directions of the optical system, as a rotation axis, and a third angular velocity detector configured to detect a third rotation angular velocity with respect to second directions, which are orthogonal to the first directions, as a rotation axis, the method comprising:

detecting, by using the first angular velocity detector, the first rotation angular velocity;

detecting, by using the second angular velocity detector, the second rotation angular velocity;

detecting, by using the third angular velocity detector, the third rotation angular velocity;

calculating a first image blur correction amount on the basis of the first rotation angular velocity detected by the first angular velocity detector, calculating a positional shift amount between the optical center position of the optical system and the rotation center position of the image sensor, calculating a positional shift compensation amount in first directions, which are orthogonal to optical axis directions of the optical system, and a positional shift compensation amount in second directions, which are orthogonal to the first directions, on the basis of the image blur correction amount and the positional shift amount that were calculated, and controlling the first driving actuator so that the first driving actuator causes the translation, on the basis of the first image blur correction amount, the positional shift compensation amount in the first directions and the positional shift compensation amount in the second directions that were calculated, wherein the optical center position of the optical system is changed on the basis of the translation of the image blur correction lens.

4. An image blur correction method for an imaging apparatus including an optical system configured to form a subject image, an image sensor configured to perform photoelectric conversion on a subject image formed by the optical system, a first driving actuator configured to cause translation and a rotational movement of the image sensor, a second driving actuator configured to cause translation of an image blur correction lens included in the optical system, a first angular velocity detector configured to detect a first rotation angular velocity with respect to optical axis directions of the optical system as a rotation axis, a second angular velocity detector configured to detect a second rotation angular velocity with respect to first directions, which are orthogonal to optical axis directions of the optical system, as a rotation axis, and a third angular velocity detector configured to detect a third rotation angular velocity with respect to second directions, which are orthogonal to the first directions, as a rotation axis, the method comprising:

detecting, by using the first angular velocity detector, the first rotation angular velocity;

detecting, by using the second angular velocity detector, the second rotation angular velocity;

detecting, by using the third angular velocity detector, the third rotation angular velocity;

calculating a first image blur correction amount on the basis of the first rotation angular velocity detected by the first angular velocity detector, calculating a second image blur correction amount on the basis of the second rotation angular velocity detected by the second angular velocity detector and a focal length of the optical system, calculating a third image blur correction amount on the basis of the third rotation angular velocity detected by the third angular velocity detector and a focal length of the optical system, calculating a positional shift amount between a position as a result of moving the rotation center position of the image sensor by a length corresponding to the second image blur correction amount and the third image blur correction amount that were calculated and an optical center position of the optical system, calculating a positional shift compensation amount in the first directions and a positional shift compensation amount in the second directions on the basis of the first image blur correction amount and the positional shift amount that were calculated, controlling the second driving actuator so that the second driving actuator causes the translation, on the basis of the second image blur correction amount and the third image blur correction amount that were calculated, and controlling the first driving actuator so that the first driving actuator causes both the translation and the rotational movement, on the basis of the first image blur correction amount, the second image blur correction amount and the third image blur correction amount that were calculated, the positional shift compensation amount in the first directions and the positional shift compensation amount in the second directions that were calculated, wherein the optical center position of the optical system is changed on the basis of the translation of the image blur correction lens.

5. An imaging apparatus comprising:

an optical system configured to form a subject image;

an image sensor configured to perform photoelectric conversion on a subject image formed by the optical system;

a driving actuator configured to cause translation and a rotational movement of the image sensor;

an angular velocity detector configured to detect a rotation angular velocity with respect to optical axis directions of the optical system as a rotation axis; and an image blur correction control unit comprising:

an image blur correction amount calculation unit configured to calculate an image blur correction amount on the basis of the rotation angular velocity detected by the angular velocity detector;

a positional shift amount calculation unit configured to calculate a positional shift amount between an optical center position of the optical system and a rotation center position of the image sensor; and a positional shift compensation amount calculation unit configured to calculate a positional shift compensation amount in first directions, which are orthogonal to optical axis directions of the optical system, and a positional shift compensation amount in second directions, which are orthogonal to the first directions, on the basis of an image blur correction amount calculated by the image blur correction amount calculation unit and a positional shift amount calculated by the positional shift amount calculation unit, and the image blur correction control unit:

controls the driving actuator so that the driving actuator causes the rotational movement of the image sensor, on the basis of the image blur correction amount calculated by the image blur correction amount calculation unit, and controls the driving actuator so that the driving actuator causes the translation of the image sensor, on the basis of the positional shift compensation amount in the first directions and the positional shift compensation amount in the second directions calculated by the positional shift compensation amount calculation unit.

* * * * *